J. S. NAYLOR.
SEED CORN TESTER.
APPLICATION FILED MAR. 16, 1910.
976,485.
Patented Nov. 22, 1910.
2 SHEETS—SHEET 1.
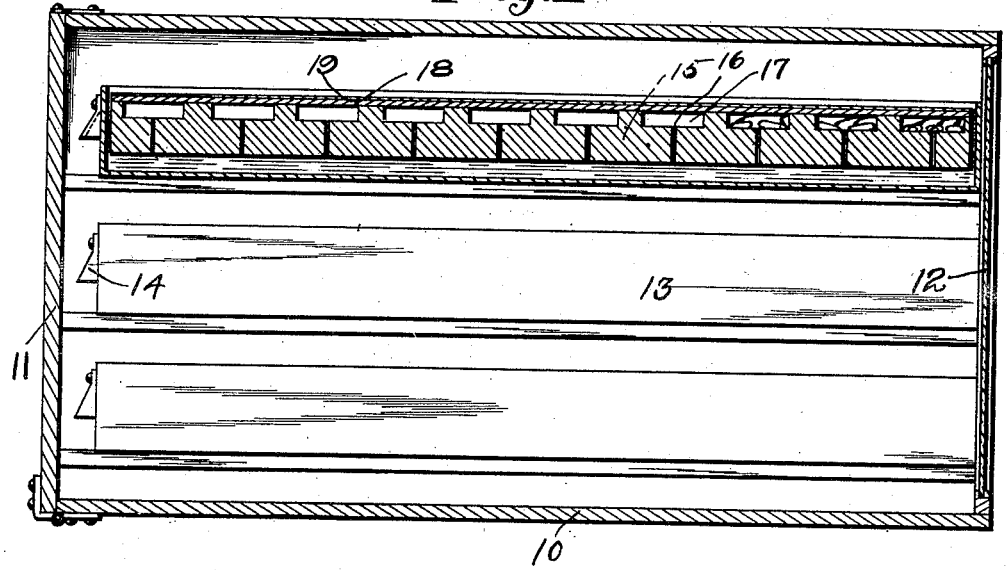
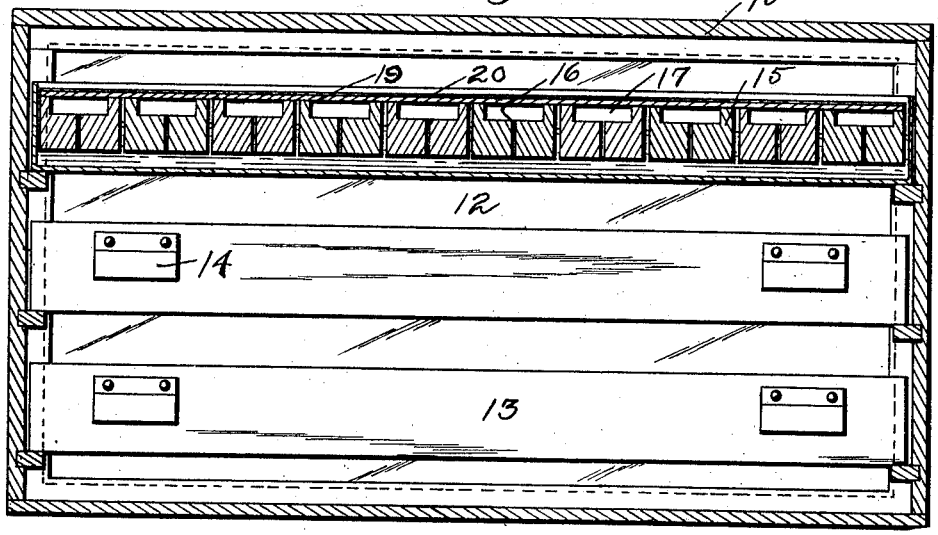
Witnesses
F. C. Caswell
W. A. Loftus
Inventor
Joseph S. Naylor
by J. Ralph Ewing Atty.

J. S. NAYLOR.
SEED CORN TESTER.
APPLICATION FILED MAR. 16, 1910.
976,485.
Patented Nov. 22, 1910.
2 SHEETS—SHEET 2.
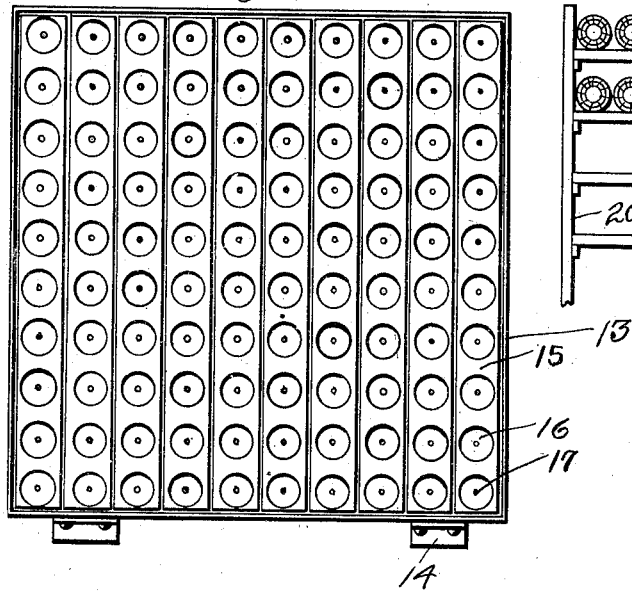
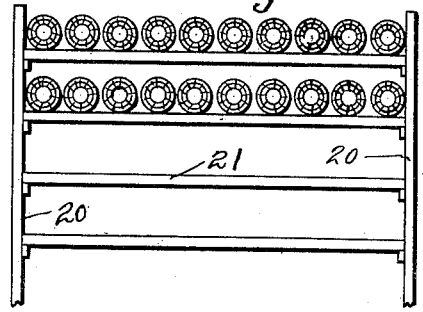
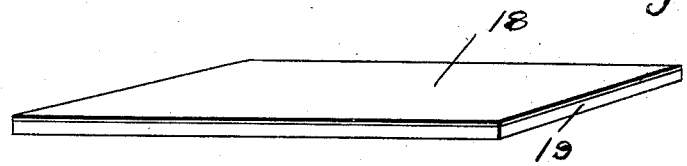
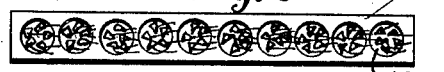
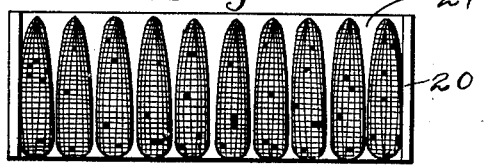
Witnesses
F. C. Caswell
W. A. Loftus.
Inventor
Joseph S. Naylor
by J. Ralph Dwig atty.

UNITED STATES PATENT OFFICE.

JOSEPH S. NAYLOR, OF AMES, IOWA, ASSIGNOR OF ONE-HALF TO C. V. GREGORY, OF AMES, IOWA.

SEED-CORN TESTER.

976,485.

Specification of Letters Patent. Patented Nov. 22, 1910.

Application filed March 16, 1910. Serial No. 549,733.

*To all whom it may concern:*

Be it known that I, JOSEPH SEWELL NAYLOR, a citizen of the United States, residing at Ames, in the county of Story and State of Iowa, have invented a certain new and useful Seed-Corn Tester, of which the following is a specification.

The object of my invention is to provide a seed corn tester of simple, durable and inexpensive construction and so arranged that ears of corn to be tested may be conveniently arranged in suitable racks and the sections of the seed corn holders may be laid along side of the racks and grains taken from the ears and placed in the adjacent compartments of the tray sections in such a manner as to avoid possibility of confusion and so that the operator may conveniently and easily place the grains of corn in the proper compartments of the tray sections and also to provide means whereby the tray sections may be removed after the grains of corn have sprouted and may be laid along side of the rack containing the ears of corn so that the ears corresponding to the particular compartments of the trays may be readily and easily identified with the ears in the rack without confusion and without the necessity of consecutively numbering the compartments of the tray sections or the ears themselves.

A further object is to provide improved means for applying moisture in proper quantities to the grains of corn to be tested without at any time submerging the grains of corn.

A further object is to provide a tester of this kind in which all of the sprouts from the grains of corn will extend in substantially parallel positions to thereby avoid being entangled with each other so that the operator may readily and easily, at a glance, determine which ones of the seeds have sprouted and which have not.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a longitudinal, sectional view of a seed corn tester embodying my invention. Fig. 2 shows a transverse, sectional view of same. Fig. 3 shows a top or plan view of a tray made up of detachable sections having compartments therein. Fig. 4 shows an end elevation of a seed corn rack to be used in connection with my improved corn tester. Fig. 5 shows a perspective view of the moisture retaining cover for the trays. Fig. 6 shows a plan view of one of the detachable tray sections containing sprouted seeds, and Fig. 7 shows a rack containing ears of corn placed adjacent thereto to illustrate the manner in which the corresponding seeds and ears of corn are identified.

Referring to the accompanying drawings, I have used the reference numeral 10 to indicate the body portion of an inclosed cabinet forming the frame of my improved corn tester. At the front thereof is a hinged door 11 by which access may be had to the interior thereof and at the rear is a glass panel 12 to permit light to the interior of the cabinet. Arranged within the cabinet is a series of sliding trays 13, each being designed to contain water and being open at its top. These trays may be removed through the opening in the front of the cabinet and are provided with notches 14 to be grasped by an operator. Within each tray I provide a number of detachable tray sections, each of which comprises a body portion 15. This body portion is preferably made of a single strip of wood of a length corresponding to the length of the tray and of such width that a number of them, preferably 10, may be placed in the tray side by side. Each of the tray sections is provided with a series of shallow round recesses 16 at its top, said recesses being equally spaced apart and being designed to receive a number of grains of corn. At the center of each of said recesses is a small opening 17 extended through the body portion of the tray section as shown in Figs. 1 and 2.

In order to conserve the moisture within the recesses 16 I preferably provide a cover for each tray composed of a flexible material having an upper layer 18 of waterproof material and a lower layer 19 of absorbent material such as felt.

My improved form of tray sections may be used in connection with any of the ordinary forms of racks for ears of corn, one form of the rack, being illustrated in Figs. 4 and 5, comprising two upright side pieces 20 with horizontally arranged shelves 21, each shelf being designed to contain a number of ears of corn laid side by side corresponding in number to the number of recesses 16 in one of the tray sections.

In practical use and assuming that the ears of corn to be tested are arranged in racks, as shown in Fig. 4, then the operator first removes from one of the trays one of the detachable tray sections. He then places it along side of the rack, as shown in Fig. 6, and then removes a number of grains of corn from each ear and places said grains in the nearest one of the recesses 16. He then returns the tray section to the tray. This process is repeated until all of the recesses 16 in the tray sections have been provided with grains of corn. Then water is placed in each of the trays 13. It does not matter how much water is placed in each tray for the reason that the wooden tray sections will float upon the water, thus keeping the recesses 16, at all times, above the water level. However the water will flow upwardly through the openings 17 to a point adjacent to the bottoms of the recesses 16 and on account of the absorbent nature of the wood the interiors of said recesses 16 will at all times be kept in moist condition. The flexible cover is then placed upon the tray and I preferably moisten the absorbent layer 19 before placing it on the tray. The waterproof cover 18 will prevent the evaporation of water and hence the interior of each recess 16 will be kept moist and the grains of corn will be in engagement with the moist surface of the wood and also with the moist surface of the absorbent material. As the water within the trays evaporates the wooden tray sections will move downwardly within the trays until they rest upon the bottom of the trays but at no time will the grains of corn in the tray sections be submerged. By providing a glass covered opening at one end of the cabinet, I gain a material advantage in devices of this kind on account of the fact that all of the sprouts from the grains of corn will extend in parallel planes toward the light so that after the grains have sprouted and the cover is removed the sprouts will not be entangled with each other but will be so arranged that an operator may, at a glance, determine which ones of the seeds have sprouted and which have not. After the cover has been removed the tray sections may then be removed one at a time and placed along side of the rack containing the seed corn and the operator may then, at a glance, determine which ones of the ears contained in the rack are desirable for planting purposes and which are not. Then the undesirable ears may be removed from the rack.

On account of the arrangement of the tray sections so that each section containing a single row of recesses may be removed and conveniently placed along side of a seed rack, I provide means whereby confusion between the various recesses in the tray sections and the ears of corn in the rack may be avoided and, hence, it is not necessary to provide consecutively arranged numbers for the recesses and the ears of corn. Each of said tray sections is thus removed from the tray in the same order in which they are placed in the tray and compared with the corresponding row of ears of corn on the rack.

By making the tray sections of wood I obtain a number of advantages: First, they are inexpensive, second, they will float upon the water and thus permit the use of a comparatively large quantity of water in the tray at the start of the test so that water need not be added after the test is started and, third, the absorbent nature of the wood will keep the grains of corn moist throughout the entire test. In addition to this the straight wooden strips that form the tray sections may be readily and easily handled by an operator in removing them from the tray or replacing them therein.

I claim as my invention:

1. In a seed tester, the combination of a tray, and a series of tray sections detachably placed therein, each tray section having a number of seed recesses therein equally spaced apart and in line with each other.

2. In a seed tester, the combination of a tray, and a series of tray sections detachably placed therein, each tray section having a number of seed recesses therein equally spaced apart and in line with each other, said tray sections each being provided with openings extending from the bottom of each recess through the tray sections to the bottom thereof.

3. In a seed tester, the combination of a tray, and a series of tray sections detachably placed therein, each tray section having a number of seed recesses therein equally spaced apart and in line with each other, said tray sections being made of absorbent material.

4. In a seed tester, the combination of a tray, and a series of tray sections detachably placed therein, each tray section having a number of seed recesses therein equally spaced apart and in line with each other, said tray sections being made of material that will float upon water.

5. In a seed tester, a tray section comprising a body portion having a series of seed recesses in its top arranged in line with each other.

6. In a seed tester, a seed receptacle, comprising a straight wooden strip having a series of round recesses in its top spaced apart from each other and arranged in line, there being an opening from the bottom of each recess extended through the body portion to the bottom thereof, for the purposes stated.

Des Moines, Iowa, March 4, 1910.

JOSEPH S. NAYLOR.

Witnesses:
H. A. LOCKWOOD,
A. A. BURGER.